June 18, 1957  E. S. JEFFERSON  2,796,224
FISHING REEL
Filed Jan. 14, 1955  2 Sheets-Sheet 1
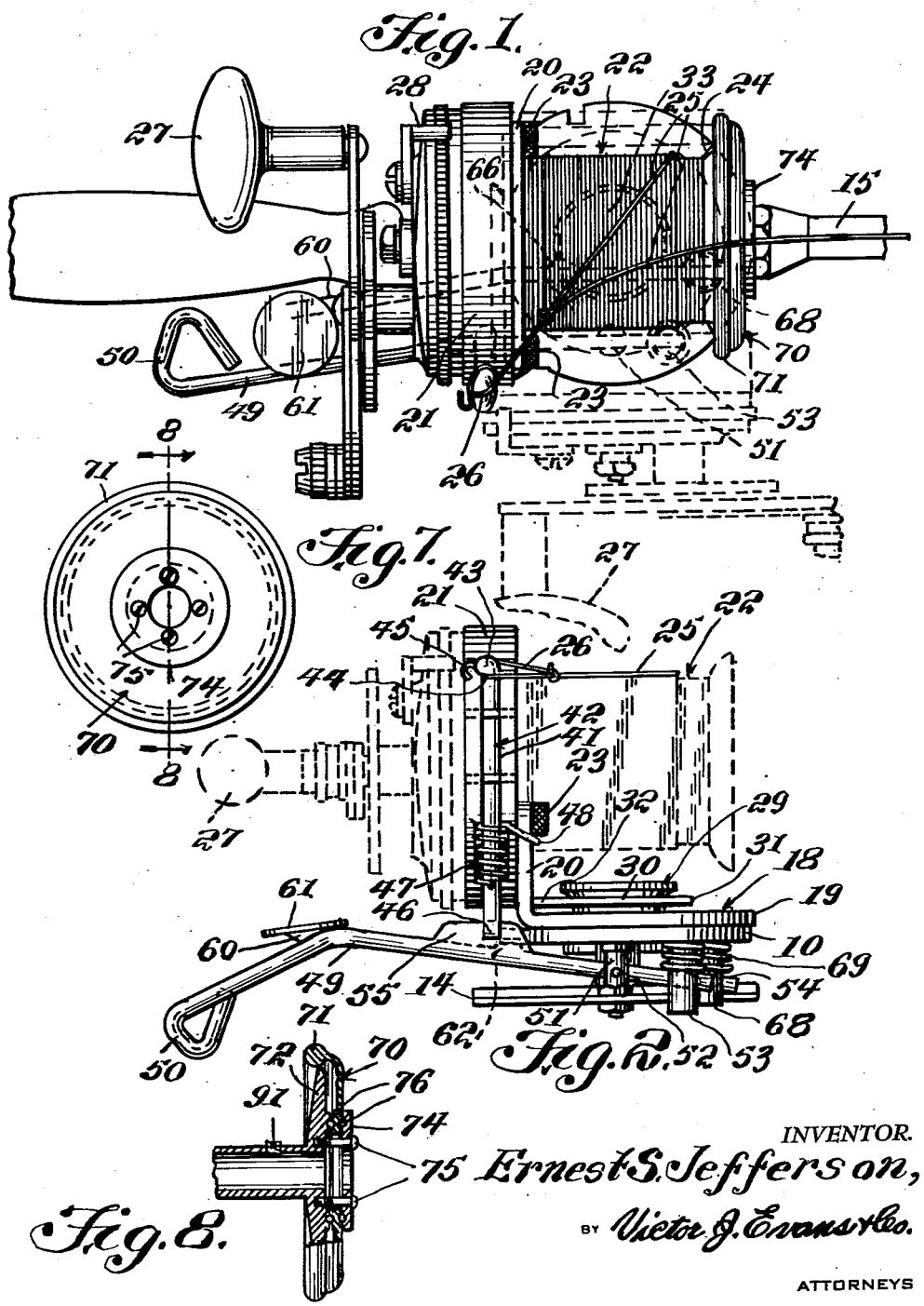
INVENTOR.
Ernest S. Jefferson,
BY Victor J. Evans & Co.
ATTORNEYS

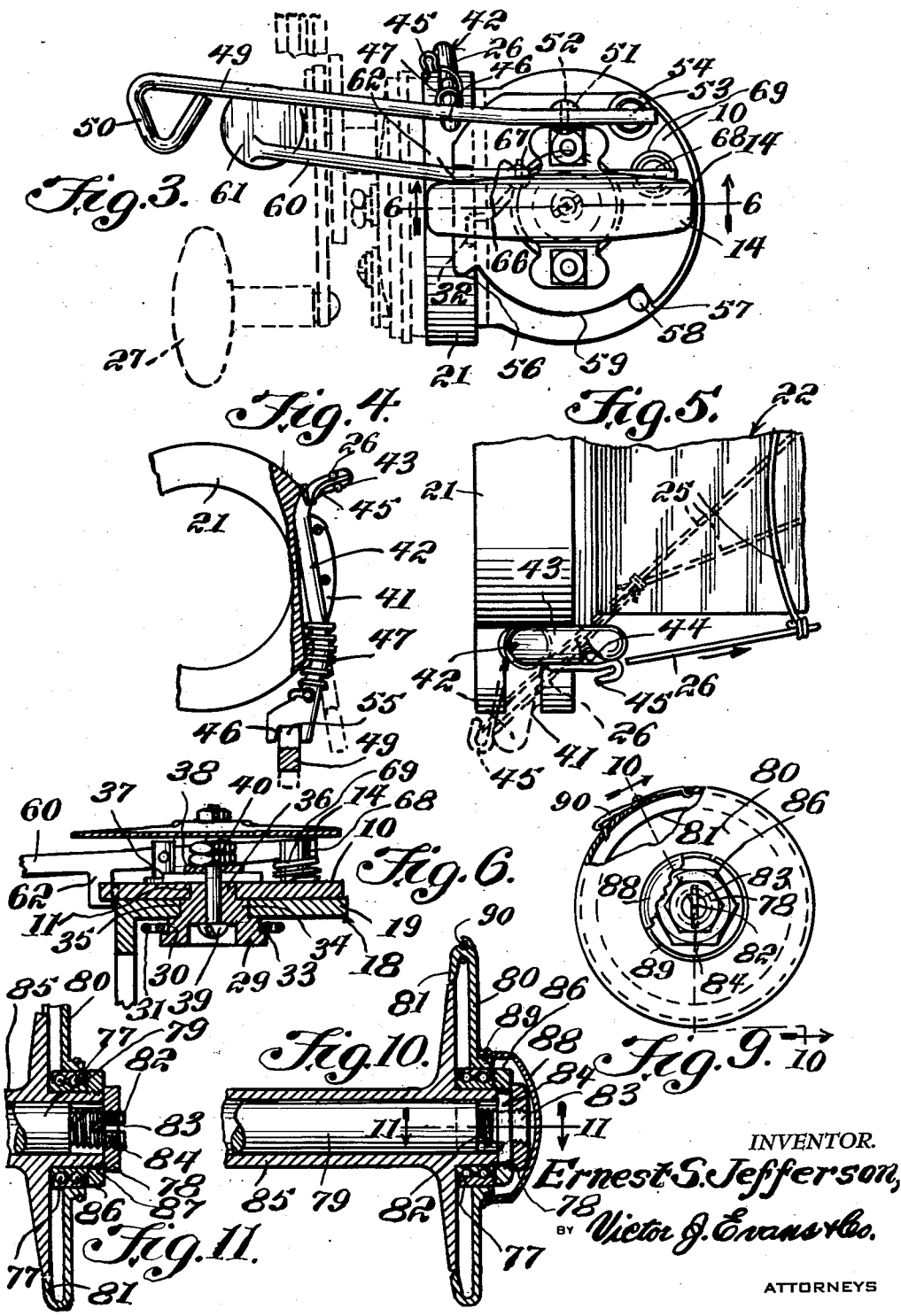

United States Patent Office 2,796,224
Patented June 18, 1957

2,796,224

FISHING REEL

Ernest S. Jefferson, Belhaven, N. C.

Application January 14, 1955, Serial No. 481,951

2 Claims. (Cl. 242—84.2)

This invention relates to fishing equipment, and more particularly to a spinning reel.

This invention is an improvement over the spinning reel shown and described in my co-pending application, Serial No. 383,477, and filed October 1, 1953, now Patent No. 2,747,811.

The object of the invention is to provide a spinning reel which includes a freely rotating ball bearing supported ring which will serve to eliminate or reduce friction as the fishing line leaves the end of the spool or reel.

Another object of the invention is to provide a spinning ring for attachment to the reel of my co-pending application so that the line will move over the outer rotary ring and turn the ring in the same direction as the line is being pulled off by the weight of the lure so that friction will be eliminated whereby the line can be heaved a greater distance and whereby the present invention will permit the use of a heavier line which is of softer texture than the lines being presently used.

A further object of the invention is to provide a frictionless spinning reel which is simple and inexpensive to manufacture.

Other objects and advantages will be apparent during the course of the following description.

In the accompanying drawings, forming a part of this application, and in which like numerals are used to designate like parts throughout the same:

Figure 1 is a top plan view of the fishing reel constructed according to the present invention.

Figure 2 is a side elevational view of the fishing reel.

Figure 3 is a bottom plan view of the fishing reel.

Figure 4 is a fragmentary elevational view, with parts broken away and in section showing the hammer.

Figure 5 is a fragmentary elevational view illustrating the loop and hammer.

Figure 6 is a sectional view taken on the line 6—6 of Figure 3.

Figure 7 is an end elevational view illustrating the spinning ring for use with the reel shown in Figure 1.

Figure 8 is a sectional view taken on the line 8—8 of Figure 7.

Figure 9 is a view similar to Figure 7 but showing a modified spinning ring.

Figure 10 is an elevational view of the ring of Figure 9, with parts broken away and in section, and taken on line 10—10 of Figure 9.

Figure 11 is a sectional view taken on the line 11—11 of Figure 10.

Referring in detail to the drawings, there is shown a spinning reel which includes a stationary disc 10 that has a central opening 11 therein. A clamp 14 is connected to the disc, and the clamp 14 is adapted to be connected to a conventional fishing rod 15 in any suitable manner. An L-shaped bracket 18 is rotatably connected to the disc 10, and the bracket 18 includes a base 19 which is arranged contiguous to the upper surface of the disc 10. Arranged at right angles with respect to the base 19 is an arm 20 which is adapted to be connected to the bracket 21 of a fishing reel 22 by screws or bolts 23, and the reel 22 includes a spool 24 which has a line 25 arranged in engagement therewith. The line 25 has a loop 26, and a handle member 27 is provided for rotating the spool 24, there being a conventional resistance member 28 for varying the resistance on the line.

A body member 29 serves to rotatably connect the bracket 18 to the disc 10, and the body member 29 embodies an upper collar portion which is provided with an annular groove 30, there being a spring member 31 arranged in engagement with the groove 30. The spring member 31 has an end 32 arranged in engagement with the arm 20, while the other end 33 of the spring 31 is connected to the body member 29. The body member 29 also includes a reduced diameter portion 34 which extends through an opening 35 in the base 19, and a smaller portion 36 extends through the opening 11 in the disc 10. Washers 37 and 38 are arranged below the disc 10, there being a bolt 39 extending through the body member 29, through the washers 37 and 38, and there being nuts 40 arranged in engagement with the bolt 39 for maintaining the parts connected together.

The bracket 21 of the reel 22 includes a channel 41 which has a hammer 42 movably mounted therein, there being a transverse finger 43 on the upper end of the hammer 42. The finger 43 has an annular groove 44 for selectively receiving the loop 26 of the line 25. A wire member 45 serves to prevent accidental disengagement of the loop 26 from the groove 44, and the lower end of the hammer 42 is bifurcated or cut away as at 46. A coil spring 47 is circumposed on the hammer 42, and the coil spring 47 includes a transverse portion 48 which engages the arm 20. A rod or arm 49 is pivotally connected to the disc 10, and the rod 49 includes a finger engaging portion 50 on its outer end. The rod 49 is pivotally connected to a bushing 51 which is secured to the lower end of the disc 10, and the rod or arm 49 is connected to the bushing 51 through the medium of a pivot pin 52. The other end of the arm 49 slidably engages a bifurcated bushing 53, there being a coil spring 54 circumposed on the bushing 53 and abutting the arm 49 for normally urging the arm 49 into the position shown in Figure 2. A projection 55 extends from the arm 49 and the projection 55 is received in the bifurcated lower end 46 of the hammer 42.

There is provided in the outer periphery of the disc 10 a cutout 59 which defines a pair of shoulders 56 and 57 that are adapted to engage a stop pin 58. The pin 58 is secured to the base 19 so that when the pin engages the shoulders, rotary movement of the base will be limited. A pivotally mounted lever 60 has a finger engaging portion 61 on its outer end and a tool 62 is carried by the lever 60 so that the tooth can move through slots whereby the bracket 18 can be maintained immobile in its various adjusted positions. The lever 60 is pivotally connected to a bushing 66 by means of a pin 67 and the bushing 66 is secured to the undersurface of the disc 10. The lever 60 also has a portion thereof slidably mounted in a bushing 68, there being a coil spring 69 circumposed on the bushing 68 for urging the lever 60 into the position shown in Figure 2.

The previously described structure has been illustrated and described in my co-pending application. However, in the present invention there is provided a means for reducing or eliminating friction caused by the line 25 passing over the end of the reel. This means comprises in Figures 1–8, a rotary ring which is indicated generally by the numeral 70. The rotary ring 70 includes an enlarged bead or edge 71, Figure 8, and the edge 71 is positioned over the outer periphery of the flange 72 which extends outwardly from the hub 73 of the spool, A washer 74 is secured to the flange 72 by suitable securing elements such as the bolt 75, and the washer 74 serves to maintain the ring 70 and ball bearings 76 in place. Thus, with the ring 70, as the line 25 goes out off the reel, the ring 70 will rotate so that there will be a minimum of friction between the parts.

Referring to Figures 9, 10 and 11 of the drawings there is shown a modified mechanism for reducing friction between the line and reel. Thus, in Figures 9, 10 and 11 there is provided a ball bearing race 77 which is mounted on the drive shaft 79, and a nut 78 is arranged in threaded engagement with a threaded stem 82 which extends outwardly from the shaft 79 for retaining the parts in their proper position. The ball bearing race 77 provides a support for a rotary ring 80, and the ring 80 may include an annular curved lip 81 which surrounds the outer periphery of the flange 72 of the spool. Thus, as the line 25 passes over the end of the reel, it will engage the outer surface of the lip 81 and the ring 80 will thereby rotate so that there will be a minimum of friction between the parts.

From the foregoing it is apparent that there has been provided a spinning fishing reel which is an improvement over the fishing reel shown and described in my co-pending application, Serial No. 383,477, now Patent No. 2,747,811. With the present invention as the fishing line 25 moves over the end of the spool or reel, the fishing line will engage the bead 71 of the rotary ring 70 so that the ring 70 will be rotated whereby friction will be materially eliminated or reduced. Thus, longer casts can be made and damage to the line 25 resulting from wear, will be prevented. Instead of using the rotary ring 70 which has the ball bearings 76 for insuring smooth rotation thereof, the ring 80 can be used. The ring 80 includes the curved lip 81 which is engaged by the line 25 as the line moves over the end of the reel as shown in Figure 1 for the ring 70, so that friction will be eliminated when using the assembly shown in Figures 9, 10 and 11. The ring 80 is rotatably supported by means of the ball bearing race 77.

Except for the operation of the spinning ring 70 or the spinning ring 80, the parts function in the same manner in this application as they do in my prior application. Thus, it will be seen that with the loop 26 hooked over the line holding hammer 42 at the groove 44, the loop leaves the hammer in proper relation to the rod tip to make a good cast. When the cast is made, the parts are in the position shown in solid lines in Figure 1 and after the cast is made and the lever or arm 49 is pressed with the thumb on the portion 50, the casting weight or lure will pull the line off the end of the spool 22. When the cast is complete and all the line 25 is carried off the spool 22 that the cast and weight will remove, then by pressing on the flat portion 61 of the lever 60, the reel will be free to rotate so that the coil spring 31 will automatically return the reel 90 degrees from the position shown in solid lines in Figure 1 to the position shown in broken lines. Then, by turning the crank or handle 27 there is provided a conventional surf reel since the lever 60 locks the reel in the broken line position of Figure 1.

The hammer 42 holds the fishing line 25 when casting due to the provision of the loop 26 which engages the groove 44. The spring 47 returns the hammer to its normal position and by manually depressing the arm 49, the hammer can be released. To operate the spinning surf reel, the reel is arranged at right angles with respect to the rod and the line is arranged on the spool up to the loop 26. The loop 26 is then hooked on the hammer 42 so that the spring 45 holds the loop on. Then, the lever 61 is depressed and the reel is twisted around 90 degrees until the reel locks in position so that the spool is parallel to the rod. To make the cast, the rod is brought back to about 3:00 o'clock and then back to about 9:00 o'clock with the thumb on the lever 50. Then the lever 50 is pressed to cause the hammer 42 to be released so that the loop and the line are taken off the spool by the weight on the line. After the cast is complete with the same thumb the lever 61 is pressed and the reel returns at right angles to the rod and the line may be retrieved in the usual manner. For trolling the reel is used at right angles to the rod and the loop 26 is disregarded and also the hammer 42 and members 50 and 61 are disregarded so that the device is used as a conventional trolling reel. For bottom or deep sea fishing the device is used in the same manner as for trolling.

The spinning ring 70 or the spinning ring 80 is mounted over the outer edge of the spool and the spinning ring can be mounted on reels of other constructions beside that shown in the present drawing. The spinning ring 80 of Figures 9, 10 and 11 could be used in heavy reels that are manufactured to fully utilize the advantages incorporated in a spinning surf reel. The present invention permits the line to leave the spool on the spinning reel more freely. In applicant's co-pending application, a certain amount of friction results as the line passes over the end of the spool but in the present invention the free running or freely rotating ring extends around and over the stationary flange 72. This permits the line 25 in casting to pull over the outer ring which is ball bearing supported and free spinning so that the ring 70 or 80 is set in motion and turns in the same direction as the line which is being pulled off by the weight of the lure. Thus, the friction heretofore created by the line having to slip over the outer edge of the spool is done away with so that there can be obtained greater distance with the same weight line. Thus, larger spinning reels can use a much heavier line of a softer texture than the monafilament line in use today. The stem 82 is provided with a slit or cutout 83 through which extends a pin 84. The hub of the reel of Figures 9, 10 and 11 is indicated by the numeral 85, there being a threaded cylindrical portion 87 extending outwardly from the hub 85, and a nut 86 is arranged in threaded engagement with the portion 87 for retaining the ball bearing race 77 in its proper position. A cap 88 may be retained in place on the ring 80 over the nuts 78 and 86, and the cap 88 can be retained in place by means of a retaining ring 89. A starter element 90 is carried by the outer portion of the ring 80. The hub 73 of the device of Figure 8 may be provided with a set screw 91 which engages the drive shaft so that as the drive shaft which extends therethrough is rotated, the hub 73 will also be rotated.

The hub 73 and flange 72 may be made in one piece. Similarly, the parts 80 and 81 may be cast in one piece and can be pressed on the ball bearings 77. The hub 73 receives the drive shaft. The nut 86 retains the parts in their proper position. The starting element 90 which is carried by the spinning ring and is used to start the ring spinning at the beginning of the cast and when the line becomes slack, the reel continues to spin but does not take off line. The drive key 84 transfers the drive from the shaft to the hub. With the present invention the line can be cast great distances since the friction will be reduced.

I claim:

1. In a fishing reel, a stationary disc provided with a central opening, a clamp connected to said disc and adapted to be connected to a fishing rod, an L-shaped bracket rotatably connected to said disc and including a base arranged at right angles with respect to the upper surface of said disc, an arm adapted to be connected to the fishing reel, said reel including a rotary spool having a line trained thereover and said line being provided with a loop, a handle member for rotating said spool, a resistance member for varying the resistance on the line, a body member for rotatably connecting said bracket to said disc and including an upper collar portion provided with an annular groove, a spring member arranged in engagement with said groove, one end of said spring member being connected to said arm and the other end of said spring member being connected to said body member, said body member including a reduced diameter portion extending through an opening in said base and a smaller portion extending through an opening in said disc, said reel being provided with a channel, a hammer movably mounted in said channel and provided with a transverse finger on its upper end having an annular groove for receiving the loop of the line, a wire member connected to said finger for preventing accidental disengagement of the loop from said groove, the lower end of said hammer being provided with a bifurcated portion, a coil spring circumposed on said hammer and including a transverse portion arranged in engagement with said arm, a rod pivotally connected to said disc and provided with a finger engaging portion on one end thereof, a bifurcated bushing slidably receiving said rod, a coil spring circumposed on said bushing and abutting said rod, a projection on said rod adapted to be received in the bifurcated lower end of said hammer, the outer periphery of said disc being provided with a cutout defining a pair of shoulders, a stop pin secured to said base for engaging said shoulders, a pivotally mounted spring pressed lever having a finger engaging portion on one end thereof, said lever adapted to lock the reel in place, and means for reducing friction as the line moves over the end of the reel, said means comprising a rotary ring, said spool including a cylindrical hub having a threaded extension, a drive shaft extending through said hub and including a reduced diameter threaded stem, a ball bearing race mounted on said extension, there being a slit in said stem, a pin extending through the slit in said stem and engaging said extension, a first lock nut mounted on said extension and engaging said ball-bearing race, a second lock nut mounted on said stem and abutting said extension, a cap extending over said nuts and detachably connected to said ring, and a spring-like starting element carried by the outer portion of said ring.

2. In a fishing reel, a stationary disc provided with a central opening, a clamp connected to said disc and adapted to be connected to a fishing rod, an L-shaped bracket rotatably connected to said disc and including a base arranged at right angles with respect to the upper surface of said disc, an arm adapted to be connected to the fishing reel, said reel including a rotary spool having a line trained thereover and said line being provided with a loop, said spool further including an annular flange, a handle member for rotating said spool, a resistance member for varying the resistance on the line, a body member for rotatably connecting said bracket to said disc and including an upper collar portion provided with an annular groove, a member arranged in engagement with said groove, one end of said spring member being connected to said arm and the other end of the spring member being connected to said body member, said body member including a reduced diameter portion extending through an opening in said base and a smaller portion extending through an opening in said disc, said reel being provided with a channel, a hammer movably mounted in said channel and provided with a transverse finger on its upper end having an annular groove for receiving the loop of the line, a wire member connected to said finger for preventing accidental disengagement of the loop from said groove, the lower end of said hammer being provided with a bifurcated portion, a coil spring circumposed on said hammer and including a transverse portion arranged in engagement with said arm, a rod pivotally connected to said disc and provided with a finger engaging portion on one end thereof, a bifurcated bushing slidably receiving said rod, a coil spring circumposed on said bushing and abutting said rod, a projection on said rod adapted to be received in the bifurcated lower end of said hammer, the outer periphery of said disc being provided with a cutout defining a pair of shoulders, a stop pin secured to said base for engaging said shoulders, a pivotally mounted spring pressed lever having a finger engaging portion on one end thereof, said lever adapted to lock the reel in place, means for reducing friction as the line moves over the end of the reel, said means comprising a rotary ring, said spool including a cylindrical hub having a threaded extension, a drive shaft extending through said hub and including a reduced diameter threaded stem, a ball bearing race mounted on said extension, there being a slit in said stem, a pin extending through the slit in said stem and engaging said extension, a first lock nut mounted on said extension and engaging said ball bearing race, a second lock nut mounted on said stem and abutting said extension, said second nut being smaller than said first nut, a cap extending over said nuts and detachably connected to said ring, a retaining member for retaining said cap in place, and a spring-like starting element carried by the outer portion of said ring, said starting element being used to start the ring spinning at the beginning of the cast and whereby when the line becomes slack, the reel continues to spin but does not take off line, said ring including an annular curved lip which surrounds the outer periphery of the flange of the spool whereby as the line passes over the end of the reel, the line will engage the outer surface of the lip and the ring will thereby rotate so that there will be a minimum of friction between the parts.

References Cited in the file of this patent

UNITED STATES PATENTS

| | | |
|---|---|---|
| 1,677,217 | Selvig | July 17, 1928 |
| 2,551,321 | Ferguson | May 1, 1951 |
| 2,640,663 | Leland | June 2, 1953 |
| 2,647,704 | Sampler et al. | Aug. 4, 1953 |
| 2,747,811 | Jefferson | May 29, 1956 |